United States Patent [19]

Lenti et al.

[11] Patent Number: 5,063,092

[45] Date of Patent: Nov. 5, 1991

[54] USE OF PERFLUOROPOLYETHERS IN THE FORM OF AN AQUEOUS MICROEMULSION FOR PROTECTING STONY MATERIALS FROM ATMOSPHERIC AGENTS

[75] Inventors: Daria Lenti; Mario Visca, both of Alessandria, Italy

[73] Assignee: Ausimont S.r.L., Italy

[21] Appl. No.: 512,907

[22] Filed: Apr. 25, 1990

Related U.S. Application Data

[63] Continuation of Ser. No. 334,522, Apr. 7, 1989, abandoned.

[30] Foreign Application Priority Data

Apr. 8, 1988 [IT] Italy ............................... 20126 A/88

[51] Int. Cl.$^5$ ............................................... B05D 3/02
[52] U.S. Cl. .................................. 427/393; 427/393.6; 428/422; 428/540; 428/541
[58] Field of Search ............................. 427/393.6, 393; 428/422, 540, 541

[56] References Cited

U.S. PATENT DOCUMENTS

| | | | |
|---|---|---|---|
| 4,499,146 | 2/1985 | Piacenti et al. | 252/384 X |
| 4,745,009 | 5/1988 | Piacenti et al. | 427/385.5 X |
| 4,746,550 | 5/1988 | Strepparola et al. | 427/393 X |

Primary Examiner—Michael Lusignan
Attorney, Agent, or Firm—Morgan & Finnegan

[57] ABSTRACT

Protecting marble, stone, tiles, cement, and similar materials utilized in the building industry from the action of atmospheric agents and pollutants, which comprises applying a perfluoropolyether having perfluoroalkyl end groups onto the surface of the article, said perfluoropolyether being in the form of an aqueous microemulsion.

6 Claims, No Drawings

USE OF PERFLUOROPOLYETHERS IN THE FORM OF AN AQUEOUS MICROEMULSION FOR PROTECTING STONY MATERIALS FROM ATMOSPHERIC AGENTS

This application is a continuation of application Ser. No. 334,522, filed Apr. 7, 1989, now abandoned.

DESCRIPTION OF THE INVENTION

1. Field of the Invention

It is known that perfluoropolyethers impart remarkable water-repellent and oil-repellent properties to the surface of materials onto which they are applied.

Furthermore, perfluoropolyethers exhibit a high Bunsen coefficient toward the air-component gases, so that they permit a good passage of air through the surface of the treated materials.

Thanks to these properties, perfluoropolyethers are interesting as liquids suitable for protecting masonry and building works and, in general, articles constructed in stone, marble, cement, tile, gypsum or wood.

Furthermore, the low refractive index of perfluoropolyethers, which corresponds to a value of about 1.3 measured at 20° C. with the light of a sodium-vapor lamp, causes the treated article to retain its original appearance, preventing interference optical phenomena which lead to color alterations.

2. Background of the Invention

The above utilization of perfluoropolyethers has already been described in an earlier Italian patent application No. 19,933 A/81.

The systems described in patent application No. 19,933 A/81 comprise, as a solvent, a fluorocarbon or a chlorofluorocarbon.

The application of said compounds to the substrate is preferably carried out by using 1,1,2-trifluorotrichloroethane solutions in admixture with other organic solvents containing from 50 to 80% by weight of perfluoropolyether products. The application is effected by means of atomized liquid jet spraying, either with or without compressed air, or by means of some other appropriate method.

The amount of perfluoropolyether protective agent utilized is highly dependent on the porosity of the material to be treated, and varies from 10 g/m² to 300 g/m² as the substrate proposity increases.

The advantage, from the viewpoint of ecology and environmental protection, which would originate from the use of systems free from chlorofluorocarbons and, possibly, from the total absence of volatile organic solvents, is very evident.

DETAILED DESCRIPTION OF THE INVENTION

In accordance with the present invention, it has now, surprisingly, been discovered that it is possible to achieve this and further advantages in the protection of works and articles made of stone, marble, cement, gypsum and wood by using, instead of perfluoropolyethers as such or in fluorochlorocarbons, water-microemulsions of functional perfluoropolyethers having perfluoroalkyl end groups.

The term "microemulsion" is generally used to designate products which are macroscopically composed of a single liquid transparent or opalescent and optically isotropic phase comprising two immiscible liquids and at least one surfactant, one of said two immiscible liquids being dispersed in the other in the form of droplets having diameters ranging from about 50 to about 2,000Å.

In principle, the presence of particles having greater or smaller sizes up to the molecular dispersion limit cannot be excluded. Furthermore, structures may be possible in which the two liquids are interdispersed as bicontinuous tridimensional, immiscible films, which are co-solubilized at a molecular level.

Such products spontaneously form merely by mixing the components when the interface tension between the two immiscible liquids sinks to values close to zero and such values are indefinitely stable over a certain temperature range.

Whenever used in the present description, the term "microemulsion" has a broader meaning, including also nonoptically isotropic systems (i.e., birefractive), characterized by a component orientation of the liquid-crystalline type.

It is advantageous to have available microemulsions instead of emulsions because the former do not require a high dispersion energy for being prepared; moreover they are regenerable and indefinitely stable in the course of time, while emulsions must be prepared taking into account the order of addition of the components and supplying a high dispersion energy; furthermore, they exhibit a limited stability over time and when, due to aging, give rise to a phase separation, often they cannot be brought again to the starting emulsion state even by employing the high energy necessary for their preparation.

The microemulsions utilized in the present invention may be of the oil-in-water type or water-in-oil type. Preferably they are of the oil-in-water (o/w) type, and consist, in the present case, of perfluoropolyether chain compounds having end groups composed of mixtures of products with different molecular weights, a perfluorinated surfactant and/or a co-surfactant such as an alkanol with 1–12 carbon atoms, and an aqueous phase optionally comprising an electrolyte and/or a water-soluble inorganic base. The microemulsions used according to the present invention may be obtained conforming to the procedures indicated in Italian patent applications No. 20,910 A/86 and 19,494 A/87.

The perfluoropolyethers of the present invention are products which per se are well known in the technical and patent literature and are generally obtained as mixtures of compounds having the necessary perfluoropolyether structure and a molecular weight which is variable over a certain range.

The perfluoropolyethers utilized in the present invention contain, besides the above-mentioned functional groups, perfluoroalkyl end groups, perferably with 1 to 3 carbon atoms.

Preferably, the molecular weight of the perfluoropolyethers range from 500 to 10,000, and still more preferably from 800 to 3,000.

The perfluoropolyethers utilized in the present invention consist of fluorooxyalkylene units selected from the following:

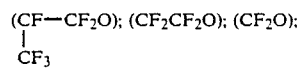

-continued $$(\underset{\underset{CF_3}{|}}{CFO}); (CF_2-\underset{\underset{CF_3}{|}}{CFO}); (CF_2CF_2CF_2O);$$

and $(CF_2CF_2CH_2O)$, and in particular belonging to one of the following classes:

$$R_fO(\underset{\underset{CF_3}{|}}{CF}-CF_2O)_n(\underset{\underset{CF_3}{|}}{CFO})_m(CF_2O)_pR'_f \quad (1)$$

with a random distribution of the perfluorooxyalkylene units, where m, n, p have such medium values as to meet the above-cited requirements concerning the mean molecular weight; where $R_f$ and $R'_f$, alike or different from each other, are perfluoroalkyl end groups;

(2) $R_fO(CF_2CF_2O)_n(CF_2O)_mR'_f$ with a random distribution of the perfluorooxyalkylene units, where m, n have such values as to meet the above-said requirements;

$$R_fO(CF_2CF_2O)_n(CF_2O)_m\left(\underset{\underset{CF_3}{|}}{CFO}\right)_p\left(\underset{\underset{CF_3}{|}}{CF}-CF_2O\right)_o-R'_f \quad (3)$$

where m, n, p, o have such values as to meet the above-said requirements;

$$R_fO\left(\underset{\underset{CF_3}{|}}{CF}-CF_2O\right)_n-R'_f \quad (4)$$

where n has such a value as to meet the above-said requirements;

(5) $R_fO(CF_2CF_2O)_nR'_f$ where n has such a mean value as to meet the above-said requirements;

(6) $R_fO(CF_2CF_2CF_2O)_nR'_f$ or $R_fO(CH_2CF_2CF_2O)_nR'_f$ where n has such a value as to meet the above-said requirements.

Perfluoropolyethers of class (1) are known under the tradename Fomblin®Y, those of class (2) under the tradename Fomblin®Z, all of them being produced by Montedison. Commercially known products of class (4) are Krytox® (DuPont).

The products of class (5) are described in U.S. Pat. No. 4,523,039; those of class (6) are described in European patent EP 148,482 to Daikin.

The products of class (3) are prepared according to U.S. Pat. No. 3,665,041. The perfluoropolyethers described in U.S. Pat. No. 4,523,039 or in J. Am. Chem. Soc. 1985, 107, 1195-1201 are also useful.

The microemulsions for use in the present invention are obtainable as described in Italian patent applications Nos. 20,910 A/86 and 19,494 A/87. Essential ingredient is an ionic or non-ionic fluorinated surfactant.

In particular, the following may be cited:
(a) perfluorocarboxylic acids with 5-11 carbon atoms and the salts thereof;
(b) perfluorosulfonic acids with 5-11 carbon atoms and the salts thereof;
(c) the non-ionic surfactants indicated in European patent application No. 51,526 and consisting of a perfluoroalkyl chain and a hydrophilic polyoxyalkylene head;
(d) monocarboxylic and bicarboxylic acids derived from perfluoropolyether and the salts thereof;
(e) non-ionic surfactants consisting of a perfluoropolyether chain linked to a polyoxyalkylene chain;
(f) perfluorinated cationic surfactants or surfactants derived from perfluoropolyethers having 1, 2 or 3 hydrophobic chains.

As a co-surfactant it is possible to use a hydrogenated alcohol having 1-12 carbon atoms, preferably 1-6 carbon atoms, or a fluoroalkanol.

The amount of perfluoropolyether protective agent to be used varies as a function of the nature of the material to be treated; in particular, it depends on its porosity. The total perfluoropolyether amount ranges from 7 g/m$^2$ for low-porosity materials to be protected, to 100 g/m$^2$ for materials having a greater porosity.

EXAMPLES

The following examples are given merely to illustrate present invention and are not to be considered as a limitation of the scope thereof.

EXAMPLE 1

Two rectangular asbestos cement test pieces (15 × 10 cm) were prepared. One of the two test pieces was used as a check while the other was brush-treated with a microemulsion prepared by adding to 3.78 g of a carboxylic acid having a mean equivalent weight of 580 and 1.62 g of a carboxylic acid having a mean equivalent weight of 361, both having a perfluoropolyether structure belonging to class (1) where $R_f$ is $CF_3$ and $R'_f$ is $CF_2COOH$, 3 ml of an ammonia solution at 10% by weight of NH$_3$, 101 ml of doubly distilled H$_2$O, 2.16 g of an alcohol having a mean molecular weight of 678 and a perfluoropolyether structure belonging to class (1), and 10.8 of a perfluoropolyether oil having a mean molecular weight of 600 and belonging to class (1) where $R_f$ is $CF_3$ and $R'_f$ is $CF_2CH_2OH$.

The system so obtained consisted of a single limpid phase, which was stable at 40° C. and exhibited the following composition by weight:

| | |
|---|---|
| fluorinated surfactants | 4.4% |
| aqueous phase | 85.0% |
| alcohol | 1.8% |
| oil | 8.8%. |

The amount of total fluorinated components deposited on the test piece was 7 g/m$^2$.

The protective efficiency was determined by means of water absorption tests on the test pieces before and after the treatment. Percent protective efficiency means the ratio of the difference of water absorbed before and after the treatment to the amount of water absorbed by the untreated material, multiplied by one hundred.

The amount of water absorbed by a test piece was measured in accordance with the method proposed by UNESCO-RILEH (International Symposium on Deterioration and Protection of Stone Instruments, Paris, 5-9 June 1978, Vol. 5, Test II.4).

The data obtained are indicated hereinbelow:

| Percent | Protective | Efficiency |
|---|---|---|
| 15 minutes | 1 hour | 10 days |

| Percent | Protective | Efficiency |
| --- | --- | --- |
| 68.8% | 64.0% | 56.7% |

EXAMPLE 2

A low porosity marble test piece was used as a check. The surface of a second test piece was brush-treated with a protective material consisting of a microemulsion prepared by adding to 3.78 g of carboxylic acid having a mean equivalent weight of 580 and to 1.62 g of a carboxylic acid having a mean equivalent weight of 361, both having a perfluoropolyether structure belonging to class (1) where $R_f$ is $CF_3$ and $R'_f$ is $CF_2COOH$, 3 ml of an ammonia solution at 10% by weight of $NH_3$, 101 ml of doubly distilled $H_2O$, 2.16 g of an alcohol having a mean molecular weight of 678 and a perfluoropolyether structure belonging to class (1), and 10.8 g of a perfluoropolyether oil having a mean molecular weight of 600 and belonging to class (1) where $R_f$ is $CF_3$ and $R'_f$ is $CF_2CH_2OH$.

The system so obtained consisted of a single limpid phase, which was stable at 40° C. and exhibited the following composition by weight:

| | |
| --- | --- |
| fluorinated surfactants | 4.4% |
| aqueous phase | 85.0% |
| alcohol | 1.8% |
| oil | 8.8%. |

The amount of total fluorinated components deposited on the test piece was equal to 18.7 g/m².

The percent protective efficiency measured after 1 hour proved to be equal to 40.7%. After 7 hours, such percent protective efficiency remained unchanged.

EXAMPLE 3

Two high-porosity marble test pieces were utilized. The first one was used as a check, while the second one was treated with a microemulsion prepared by adding to 3.78 g of a carboxylic acid having a mean equivalent weight of 580 and to 1.62 g of a carboxylic acid having a mean equivalent weight of 361, both having a perfluoropolyether structure belonging to class (1) where $R_f$ is $CF_3$ and $R'_f$ is $CF_2COOH$, 3 ml of an ammonia solution at 10% by weight of $NH_3$, 101 ml of doubly distilled $H_2O$, 2.16 g of an alcohol having a mean molecular weight of 678 and a perfluropolyether structure belonging to class (1) where $R_f$ is $CF_3$ and $R'_f$ is $CF_2CH_2OH$, and 10.8 g of a perfluoropolyether oil having a mean molecular weight equal to 600 and belonging to class (1).

The thus-obtained system consisted of a single limpid phase, which was stable at 40° C. and exhibited the following composition by weight:

| | |
| --- | --- |
| fluorinated surfactants | 4.4% |
| water phase | 85.0% |
| alcohol | 1.8%. |
| oil | 8.8% |

The amount of total fluorinated components deposited on the test piece was 17.4 g/m².

The percent protective efficiency after 1 hour was 79.3% and after 7 hours remained unchanged.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. A process for protecting marble, stone, tiles, cement, gypsum or wood and other similar materials utilized in the building industry, from deterioration caused by atmospheric agents and pollutants, comprising applying onto said materials a protective agent comprising aqueous microemulsions of perfluropolyethers, said perfluoropolyethers consisting of perfluoropolyethers containing perfluoroalkyl end groups.

2. A process for protecting marble, stone, tiles, cement, gypsum or wood and other similar materials utilized in the building industry from the deterioration caused by atmospheric agents and pollutants, comprising applying onto said materials a protective agent selected from the products having perfluoropolyether structure composed of sequences of fluorooxyalkylene units selected from the class consisting of:

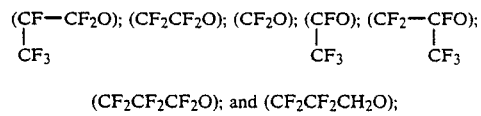

$(CF_2CF_2CF_2O)$; and $(CF_2CF_2CH_2O)$;

having perfluoroalkyl end groups and furthermore being characterized in that the perfluoropolyether product is applied in the form of an aqueous microemulsion.

3. A process of claim 2, wherein the fluorooxyalkylene units belong to the following classes:

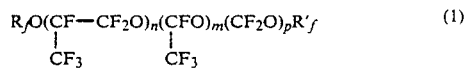

with a random distribution of the perfluorooxyalkylene units, where m, n, p have such mean values as to meet the above-indicated requirements concerning the mean molecular weight; where $R_f$ and $R'_f$, like or different from each other, are perfluoroalkyl groups;

(2) $R_fO(CF_2CF_2O)_n(CF_2O)_mR'_f$ with a random distribution of the perfluorooxyalkylene units, where m, n have such values as to meet the above-said requirements;

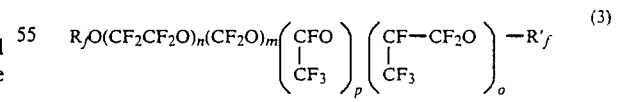

where m, n, p, o have such values as to meet the above-said requirements;

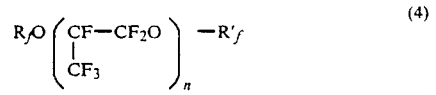

where n has such a value as to meet the above-indicated requirements;

(5) $R_fO(CF_2CF_2O)_nR'_f$ where n has such a mean value as to meet the above-said requirements;

(6) $R_fO(CF_2CF_2CF_2O)_nR'_f$ or $R_fO(CH_2CF_2CF_2O)_nR'_f$ where n has such a value as to meet the above-indicated requirements.

4. The process of claim 2, wherein the perfluoropolyethers having perfluoroalkyl end groups have a molecular weight ranging from 500 to 10,000.

5. The process of claim 2, wherein the perfluoropolyethers having perfluoroalkyl end groups have a molecular weight ranging from 800 to 3,000.

6. The process of claim 2, wherein said microemulsions are of the oil-in-water type or of the water-in-oil type.

* * * * *